C. C. ROBBINS.
TYPE WRITING MACHINE.
APPLICATION FILED JULY 11, 1906.
940,363.
Patented Nov. 16, 1909.
2 SHEETS—SHEET 1.
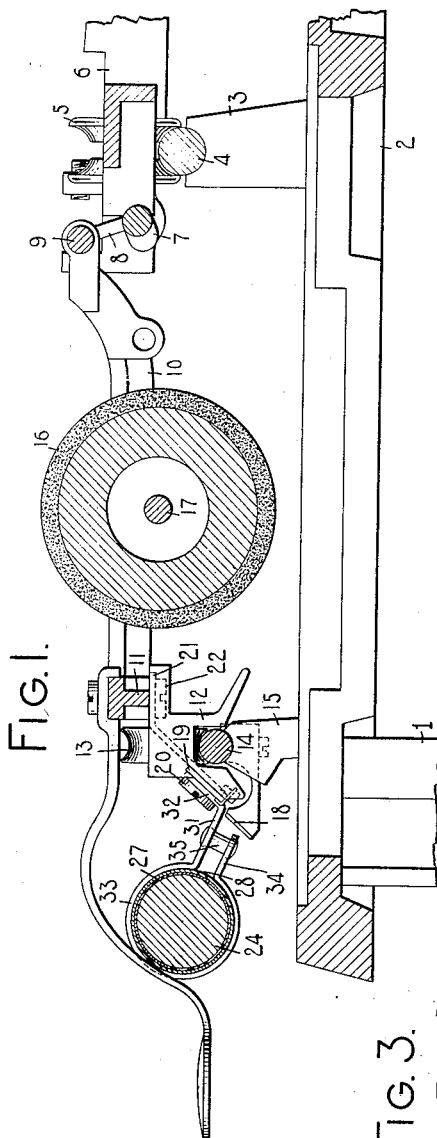
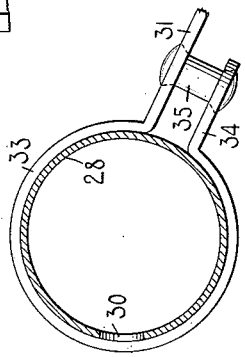
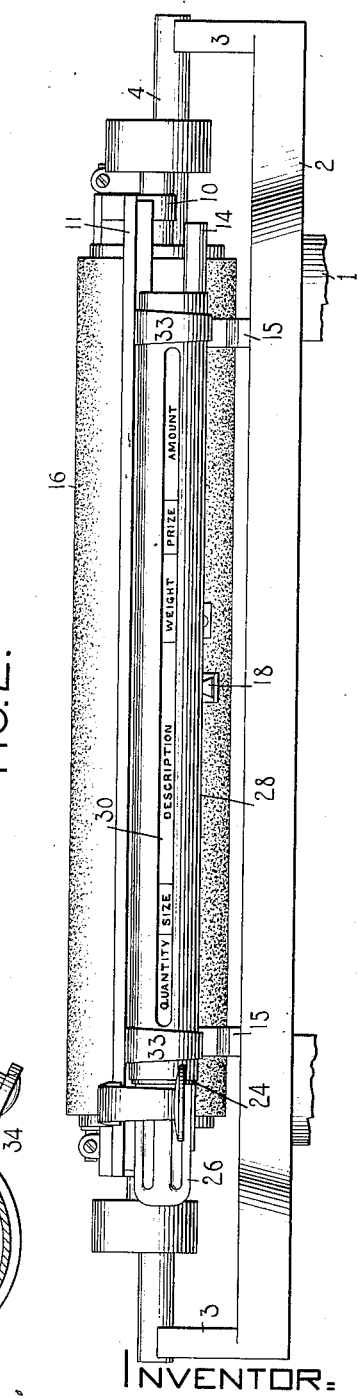
WITNESSES:
E. M. Wells
M. W. Pool
INVENTOR:
Christopher C. Robbins
By Jacob Felbel
His ATTORNEY

C. C. ROBBINS.
TYPE WRITING MACHINE.
APPLICATION FILED JULY 11, 1906.

940,363.

Patented Nov. 16, 1909.
2 SHEETS—SHEET 2.

WITNESSES:
E. M. Wells
M. W. Pool

INVENTOR:
Christopher C. Robbins
By Jacob Felbel
HIS ATTORNEY

UNITED STATES PATENT OFFICE.

CHRISTOPHER C. ROBBINS, OF PORTLAND, OREGON, ASSIGNOR TO WYCKOFF, SEAMANS & BENEDICT, OF ILION, NEW YORK, A CORPORATION OF NEW YORK.

TYPE-WRITING MACHINE.

940,363.

Specification of Letters Patent. Patented Nov. 16, 1909.

Application filed July 11, 1906. Serial No. 325,621.

*To all whom it may concern:*

Be it known that I, CHRISTOPHER C. ROBBINS, citizen of the United States, and resident of Portland, in the county of Multnomah and State of Oregon, have invented certain new and useful Improvements in Type-Writing Machines, of which the following is a specification.

My invention relates more especially to scales for typewriting machines and has for its main object to provide an improved scale device or heading holder having a plurality of scales, headings or indexes variously marked for different kinds of work, which device may be manipulated to bring readily any desired scale, heading or index to working position.

To the above and other ends the invention consists in the features of construction, combinations of devices and arrangements of parts hereinafter described and particularly pointed out in the claims.

In carrying out my invention in the present instance, I employ a scale-bar, heading-holder or index-member which is preferably cylindrical and is provided with a number of different scales or headings arranged longitudinally of the scale bar and parallel with each other. Associated with the scale-bar or heading-holder is a shield, casing or housing having a longitudinal reading-opening or slit and within which the scale bar is adapted to be turned to bring any desired scale or heading opposite the reading-opening through which said scale or heading may be read, the other scales or headings being at the same time covered. I prefer, as shown in the present instance, to mount the casing and scale bar on the carriage or traveling element of a typewriting machine and to make use of my improved device in connection with the usual carriage scale and pointer of the machine. It will be apparent, however, that my novel device may be mounted on a stationary part if desired and that the usual carriage scale may be dispensed with.

The invention is illustrated as applied to a No. 6 Remington typewriting machine but it is to be understood that the nature of the invention is such that it may be readily adapted to other forms of writing machines.

Figure 4:
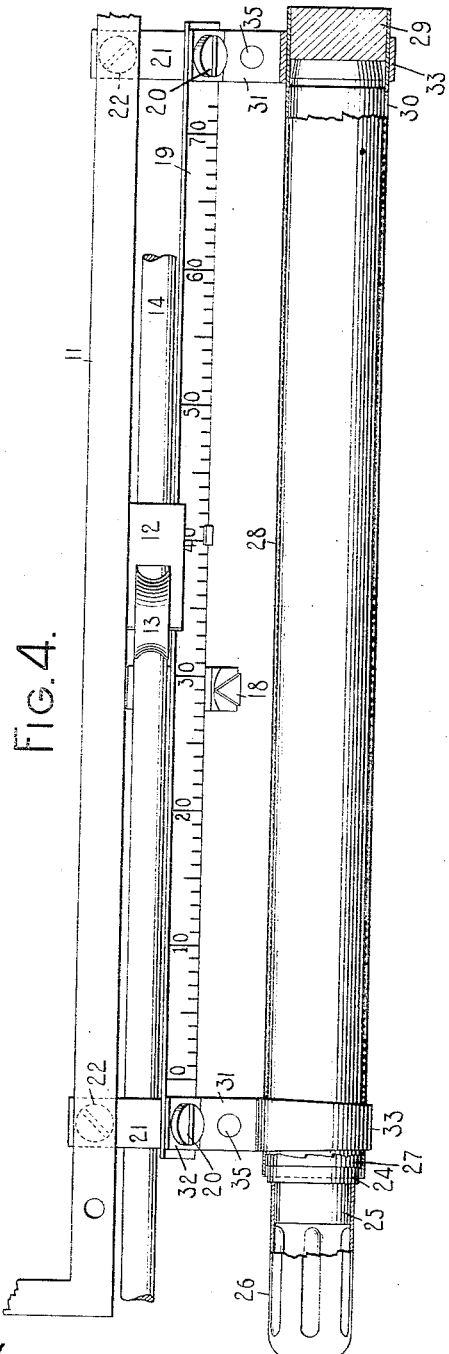
Figure 5:
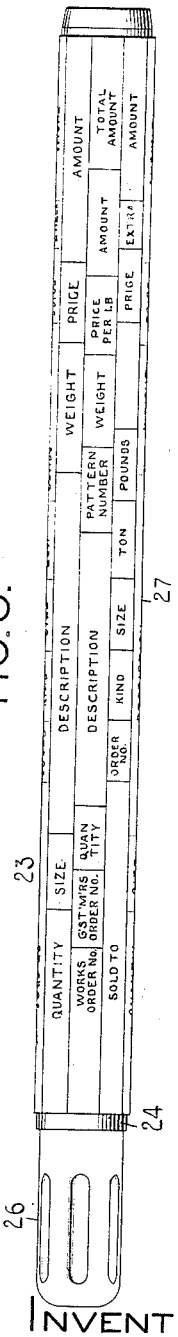

In the accompanying drawings, Figure 1 is a full-sized front to rear sectional view of the upper part of a typewriting machine embodying my invention, parts of the machine being omitted and parts being broken away. Fig. 2 is a front elevation of the parts shown in Fig. 1 but drawn to a smaller scale. Fig. 3 is an enlarged transverse sectional view of the casing or cover of my improved scale-bar or heading-holder, part of one of the supporting brackets of said casing being shown associated therewith. Fig. 4 is a full-sized top view partly in section of my improved scale device, its supporting brackets and the front part of the carriage to which said supporting brackets are secured. Fig. 5 is a full-sized detached plan view of my improved scale bar or heading holder.

In the drawings the main frame of the machine is shown as comprising corner posts 1 which support a top plate 2, rising from which are standards 3 to which is fixed a cylindrical track-way 4. Coöperating with the track-way are rollers 5 mounted in a carriage truck 6, said carriage truck being pivotally connected by a rock shaft 7 and arms 8 with a rectangular platen frame comprising a rear bar 9, side bars 10 and a front bar 11. A yoke piece 12, suitably secured to the front bar 11, carries a wheel or roller 13 which coöperates with a shiftable front rail 14 secured to arms 15 pivoted on the machine frame. A rotary platen 16 has an axle 17 journaled in the side bars 10 of the platen frame or carrier, said carrier with the carriage truck 6 constituting a platen carriage. A pointer 18 of suitable construction is secured to the front rail 14 and coöperates with the usual platen scale 19, said scale being fastened by headed screws 20 to angled arms 21 projecting forwardly and downwardly from the under side of the front bar 11 to which said arms are secured by headed screws 22. The carriage feeding mechanism and printing devices may be of the usual or suitable construction and a description of them is not deemed necessary to a complete understanding of the present invention.

The novel scale-bar or heading-holder is shown detached in Fig. 5 and is designated as a whole by the reference numeral 23. The body 24 of the scale bar is preferably cylindrical and if made solid should be of some comparatively light material, that shown in the drawings being made of wood. The left end of the scale bar is preferably reduced as indicated at 25 (Fig. 4) and receives a hollow corrugated metal handle or finger piece 26 which may be driven in place on the end of the scale-bar or otherwise suitably secured. The body portion of the bar may be formed with a plurality of scales or headings extending longitudinally of the scale bar and parallel with each other. In the present instance, however, I have preferred to mark or form such scales or headings on a scale sheet or heading strip 27 of paper or other suitable material, said scale sheet after being marked being rolled around and secured to the body of the scale bar by any suitable means, such as glue, paste or the like. In the present instance the scale sheet 27 is provided with a plurality or set of scales differently marked and such as may be used in the business of an iron and steel concern. It will, of course, be understood that the character and arrangement of the scales or markings on the scale sheet will differ with the character and exigencies of the business in which the scales are to be employed.

It will be apparent that with a scale bar of the dimensions shown and with scales or headings of a width shown in Fig. 5 a considerable number of scales may be arranged on the scale bar; six or eight, or even more, if the width of the scales be narrowed. In Fig. 5 the shading is omitted from the scale sheet for the sake of clearness and in Fig. 4 the scale sheet is shaded but the scales or markings are omitted from said scale sheet.

The scale-bar with the scale sheet thereon is preferably arranged in a cylindrical housing or casing 28 preferably made of thin metal and closed at one end as by a block 29 (Fig. 4) and open at the other end to receive the scale-bar. The casing is provided at its front side with a longitudinal slit or opening 30 which is of such width that one only of the scales on the scale bar may be read at a time therethrough and is of a length that corresponds substantially to the length of the carriage scale 19. The casing, it will be noted, is in the nature of a shield which covers or conceals from the view of the operator the parts of the scale-bar not in use. The scale-bar is frictionally held in the casing so that it will remain in any position to which it may be turned, at the will of the operator. The casing 28 is mounted in supports or brackets 31 which have angularly disposed rear portions 32 formed with openings through which the headed screws 20 pass, the supports being thereby clamped or secured between the heads of the screws 20 and the face of the carriage scale 19. The forward ends of the supports or brackets 31 are curved as indicated at 33 to embrace the casing 28 near its ends, the free ends 34 of the supports 31 being bent parallel with the body portions thereof and being connected with said body portions by rivets 35. It will be noted that the forward ends of the supports 31 are in the nature of split collars which surround the casing 28 and are adapted to securely clamp said casing when the rivets 35 are secured in place. The parts are so proportioned and arranged that the casing 28 is disposed well forward of the carriage scale 19 and the coöperating pointer 18 so that the reading of said scale and pointer is not interfered with. Furthermore the reading-opening 30 in the casing is shown so disposed with relation to the scale 19 and pointer 18, that the scales on the scale bar may be in turn read through said opening in connection with the reading of the carriage scale 19 and the pointer 18. This arrangement is a convenient one since by it I am enabled to dispense with an additional pointer and scale to be used in connection with the scale bar; although, of course, if desired such a pointer and such a scale may be applied readily to the parts shown.

Each of the scales or headings on the scale sheet or the heading strip 27 is divided as usual into a number of columns, each column being appropriately marked. When it is desired to prepare a bill or statement, the scale-bar is turned in the casing until the scale or heading on said scale-bar corresponding with the heading on the bill or statement to be written is opposite the reading-opening 30 in the casing and may be read therethrough. It will be understood that the columns as marked off on the scale or heading which is in working position will bear a particular relation with the graduations on the regular carriage scale 19. It will further be understood that the bill sheet, statement or work sheet to be written upon should be entered or fed into the machine in such a way that the heading on said bill should bear a relation with the usual platen scale (not shown) corresponding to the relation between the heading on the scale-bar and the carriage scale 19. It is not thought necessary to describe in detail the manner of using the scale-bar in the operation of printing the various kinds of work sheets. Such a scale-bar as the one I have shown and others having corresponding functions, are much used in tabular work, and, as is well understood, tabulating devices are commonly employed to facilitate the execution of such work. When such tabulating devices are so employed and my invention is made use of in connection therewith, said invention greatly facilitates the execution of the work as the operator is enabled, without raising the carriage to see just what place or columnar field the types will strike when actuated. The invention, however, may, of course, be employed either with or without tabulating mechanism, and in some instances the employment of my device may enable the operator to dispense with a tabulator and attain the desired ends with as great or greater facility than when a tabulator is employed.

My novel device is superior to scale or heading devices heretofore known and especially so in business in which a variety of billing or statement work is used, since by the employment of my invention a considerable number of different styles of headings or scales are readily available, it being only necessary to turn the handle 26 of the scale bar to bring one or another of such headings or scales to working position. As has been stated the scale-bar is frictionally held within the casing in any desired position, it being in the nature of a rotary core; but it will, of course, be evident that a positive retaining means may be employed for holding said scale-bar if desired. It will furthermore be apparent that scales or headings may be added or changed with facility from time to time as the necessities of the business may require.

Various changes may be made in the details of construction and arrangements of parts without departing from the scope of my invention.

What I claim as new and desire to secure by Letters Patent, is:—

1. In a typewriting machine, the combination of a scale casing, a removable core therein, and a sheath of paper or the like suitably attached to said core and provided with a plurality of scales.

2. In a typewriting machine, the combination of a scale casing having a reading opening, a removable rotary core in said casing, and a scale sheet suitably attached to said core and provided with a plurality of scales.

Signed at Portland, in the county of Multnomah, and State of Oregon, this 30th day of June A. D. 1906.

CHRISTOPHER C. ROBBINS.

Witnesses:
C. M. LEONARD,
FRANKLIN TAYLOR.